United States Patent
Leonhardi et al.

(10) Patent No.: US 11,455,393 B2
(45) Date of Patent: Sep. 27, 2022

(54) DEVICE FOR SECURING DIAGNOSTIC COMMANDS TO A CONTROL UNIT, AND CORRESPONDING MOTOR VEHICLE

(71) Applicant: Robert Bosch GmbH, Stuttgart (DE)

(72) Inventors: Alexander Leonhardi, Kirchheim/Teck (DE); Mats Aakesson, Lund (SE); Oliver Kust, Stuttgart (DE); Stefan Syberichs, Korntal-Muenchingen (DE)

(73) Assignee: Robert Bosch GmbH, Stuttgart (DE)

( * ) Notice: Subject to any disclaimer, the term of this patent is extended or adjusted under 35 U.S.C. 154(b) by 160 days.

(21) Appl. No.: 16/753,614

(22) PCT Filed: Oct. 9, 2018

(86) PCT No.: PCT/EP2018/077464
§ 371 (c)(1),
(2) Date: Apr. 3, 2020

(87) PCT Pub. No.: WO2019/072840
PCT Pub. Date: Apr. 18, 2019

(65) Prior Publication Data
US 2020/0272735 A1 Aug. 27, 2020

(30) Foreign Application Priority Data
Oct. 13, 2017 (DE) .................. 10 2017 218 359.4
Sep. 4, 2018 (DE) .................. 10 2018 214 999.2

(51) Int. Cl.
*G06F 11/00* (2006.01)
*G06F 21/57* (2013.01)
(Continued)

(52) U.S. Cl.
CPC ............ *G06F 21/57* (2013.01); *G06F 11/079* (2013.01); *G06F 11/0739* (2013.01);
(Continued)

(58) Field of Classification Search
CPC ............... G06F 11/0796; G06F 11/079; G06F 11/0739; G06F 21/51; G06F 21/57;
(Continued)

(56) References Cited

U.S. PATENT DOCUMENTS

2018/0247045 A1* 8/2018 David .................... G06F 21/121
2019/0315293 A1* 10/2019 Arai ....................... B60W 10/06
2020/0361412 A1* 11/2020 Ogawa ................... H04L 67/12

FOREIGN PATENT DOCUMENTS

CN 104572141 A 4/2015
DE 102015209116 A1 11/2016
(Continued)

OTHER PUBLICATIONS

International Search Report dated Jan. 8, 2019 in connection with International Application No. PCT/EP2018/077464.

*Primary Examiner* — Marc Duncan
(74) *Attorney, Agent, or Firm* — Norton Rose Fulbright US LLP; Gerard Messina

(57) ABSTRACT

A device for monitoring diagnostic commands to a control unit. The device includes an execution platform, and a security device connected to the execution platform, with a command filter and state machines. The execution platform is configured to generate the diagnostic commands based on predefined scripts. The command filter is configured to select valid commands from among the diagnostic commands, based on conditions following from states of the state machines. The security device is configured to relay the commands to the control unit.

10 Claims, 2 Drawing Sheets

(51) Int. Cl.
*G06F 11/07* (2006.01)
*G06F 21/70* (2013.01)
*G06F 21/51* (2013.01)

(52) U.S. Cl.
CPC .......... *G06F 11/0796* (2013.01); *G06F 21/51* (2013.01); *G06F 21/70* (2013.01); *G06F 2221/034* (2013.01)

(58) Field of Classification Search
CPC ........ G06F 21/71; G06F 21/75; B60W 50/04; B60W 50/045; B60W 2050/0052
See application file for complete search history.

(56) References Cited

FOREIGN PATENT DOCUMENTS

DE 102016115669 A1 3/2017
DE 102016201279 A1 8/2017

\* cited by examiner

DEVICE FOR SECURING DIAGNOSTIC COMMANDS TO A CONTROL UNIT, AND CORRESPONDING MOTOR VEHICLE

FIELD

The present invention relates to a device for securing diagnostic commands to a control unit. Moreover, the present invention relates to a corresponding motor vehicle.

BACKGROUND INFORMATION

Unified Diagnostic Services (UDS) according to ISO 14229 for maintenance of automotive control units are conventional. With the aid of such services, it is possible, for example, to query the error memory of individual electronic control units (ECUs) or update them with new firmware or application software. For this purpose, the UDS standard defines a communication protocol on the session layer and the application layer of the OSI reference model.

German Patent Application No. DE 102016201279 A1 describes a method for monitoring updating of a vehicle, including the following steps: The vehicle is transferred into a secure state; the secure state is locked; an energetic state of the vehicle is queried; depending on the energetic state, either a control unit of the vehicle is updated, or the method is prematurely aborted in a controlled manner and the secure vehicle state is unlocked.

SUMMARY

The present invention provides a device for monitoring diagnostic commands at one or multiple control units, and a corresponding motor vehicle.

In accordance with the present invention, appropriate command sequences based on interpreted script languages (such as Python) may be generated to allow flexible control processes of diagnostic or software update commands. Languages that are compiled for a virtual machine that executes a generic byte code (such as Lua or Java) are also used.

Such flexible control processes are processed by potentially untrustworthy scripts, which are processed by an equally untrustworthy script interpreter that runs on an ECU and is possibly not designed for safety applications. In a safety-relevant system, such a setup may result in the risk of inadvertent interventions in safety-relevant control units due to faulty control processes when there are no mechanisms to reduce this risk.

Thus, on the one hand, script-based programming provides a high level of flexibility and represents a dynamic technology for future applications. On the other hand, most safety standards require static programming with clearly defined states. This problem is exacerbated with the installation of firmware and software updates via the air interface (over the air (OTA)), in which, in contrast to updating in the repair shop, unintentional actions may be carried out at any time and place without defined states and monitoring.

Therefore, to allow the use of established diagnostic protocols and script-based processing in safety-relevant systems, an example system architecture is provided in accordance with the present invention to separate the execution of the diagnostic command sequence generation, the monitoring of the commands, and the receiving of safety-relevant ECU. In addition, an example method is provided in accordance with the present invention for monitoring the diagnostic commands in order to protect safety-relevant embedded target ECUs from inadvertent interventions. The term "diagnostic commands" is used in a broad sense for arbitrary command sequences in order to control embedded target ECUs for purposes of diagnosis, software updates, or within the scope of other applications.

The software architecture as well as the method for monitoring the diagnostic commands allow the use of established diagnostic communication protocols such as UDS for safety-relevant applications.

Advantageous refinements and enhancements of the example embodiments of the present invention are possible via the measures described herein. Thus, a command filter may be provided to select valid commands from among the diagnostic commands, based on predefined conditions. These conditions may be adapted to meet the requirements of various safety standards.

BRIEF DESCRIPTION OF THE DRAWINGS

Exemplary embodiments of the present invention are illustrated in the figures and explained in greater detail below.

DETAILED DESCRIPTION OF EXAMPLE EMBODIMENTS

Figure 1:
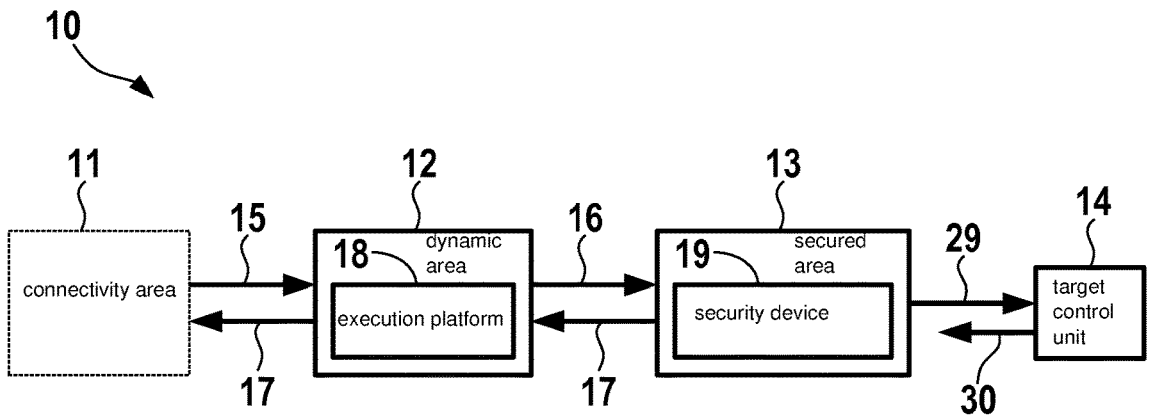
FIG. 1 shows the system architecture according to one specific example embodiment of the present invention.

The system architecture of example device 10 in accordance with the present invention illustrated in FIG. 1 is divided into three parts. Discernible, first of all, is a dynamic area 12 whose flexible execution platform 18 is used for script-based generation of diagnostic commands 16, software updates, or future applications and relaying them to target control unit 14. Dynamic area 12 does not necessarily meet the requirements of a given safety integrity level (SIL) as defined, for example, for safety-relevant systems in motor vehicles. Therefore, scripts 15 are not necessarily developed in accordance with safety standards.

In the case of OTA applications such as remote diagnosis or firmware or software updates, dynamic area 12 may obtain scripts 15 from another domain, for example via a wireless connection of a backend infrastructure, referred to below as connectivity area 11. This connectivity area 11 may, but does not have to, be provided on a separate ECU without safety requirements. Scripts 15 are processed and converted into sequences of diagnostic commands 16 in dynamic area 12.

In addition, a secured area 13 on a safety integrity level is provided which takes into account the safety relevance of an inadvertent activation of embedded target control unit 14 by external diagnostic commands 16. This secured area 13 may be associated with each ECU having a corresponding security integrity. Secured area (13) includes in particular a security device 19 that functions as a firewall in a manner of speaking, and monitors diagnostic commands 16 from dynamic area 12 and relays them only selectively to target control unit 14 to prevent inadvertent intervention in its functioning.

Responses 30 by target control unit 14 are normally returned to dynamic area 12 and monitored by secured area 13. In the event of error messages, these may be evaluated by security device 19 in order to block diagnostic commands 16.

Information 17 from security device 19 to dynamic area 12 or to connectivity area 11 may be, for example, information concerning blocked commands 29 or operating states of security device 19.

Figure 2:
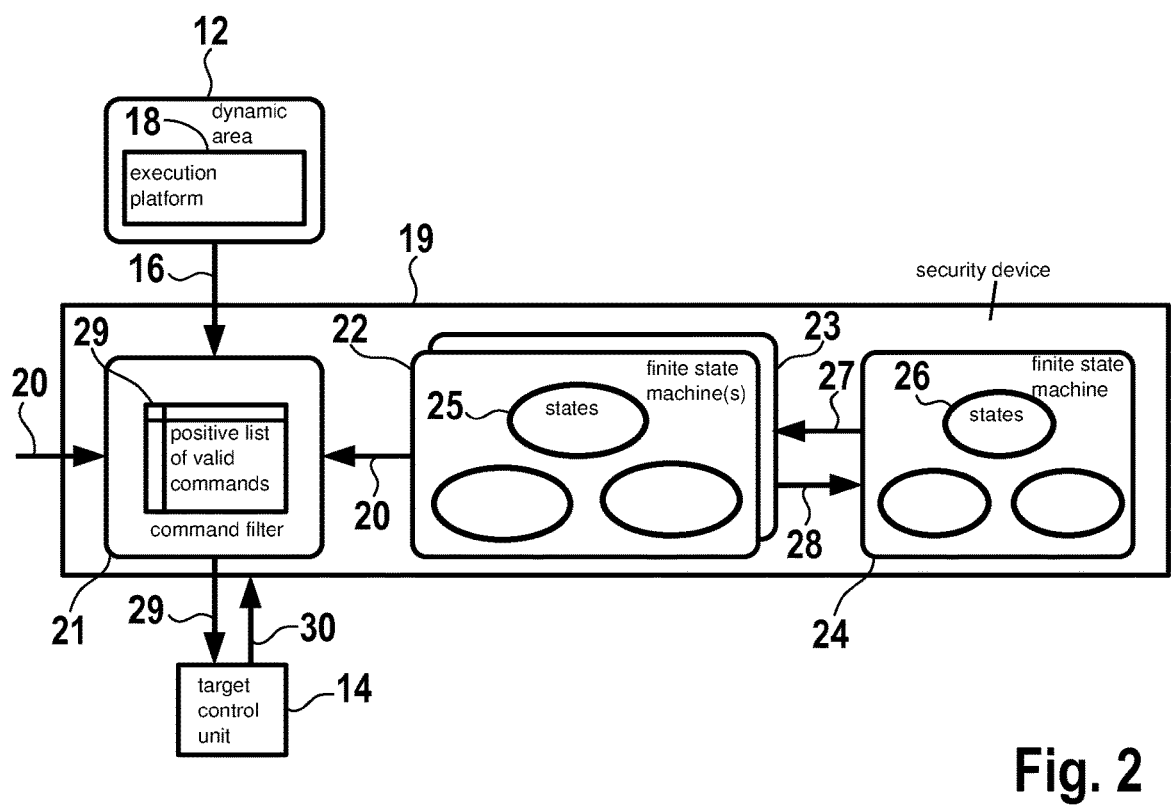
FIG. 2 schematically shows a security device component of this specific embodiment.

As depicted in FIG. 2, this "firewall" component relays valid commands 29 to embedded target control unit 14 only according to defined conditions 20. These conditions 20 may be the result of one or multiple finite state machines (FSMs) 22, 23, 24 on various levels within device 10. In particular application states 25, for example for remote diagnosis or updates, or overall device states 26 are considered. These states 25, 26 may, but do not necessarily, depend on one another, for example in the course of an information exchange 27 or due to a mutual blocking relationship 28. Interfaces for external specifying conditions 20 or dependencies of conditions 20 on responses 30 by target control units 14 may also be provided.

With these conditions 20, it is possible to define secured operating states of device 10 in the course of development. Depending on conditions 20, there is preferably a positive list of valid commands 29 that are allowed to pass through command filter 21, while invalid commands are suppressed. The filtering and blocking may take place according to various configuration specifications of security device 19. For example, the following are possible:
1. Blocking of any diagnostic commands 16,
2. Blocking those diagnostic commands 16 that originate from certain ECUs or that are addressed to a certain control unit 14,
3. Checking and filtering on the level of individual diagnostic commands (16) to allow certain valid commands 29 in certain states 25, 26, and to suppress, among other things, security access, reset, or other impermissible diagnostic commands 16,
4. Checking diagnostic commands 16 and their parameters to identify valid commands 29 based on certain parameters, and to prevent other types of access, such as writing to certain memory addresses of control unit 14,
5. Blocking diagnostic commands 16 whose occurrence exceeds a predefined frequency in order to avoid the failure mode, referred to as "blubbering idiot" in technical jargon. It is also possible to block diagnostic commands 16 having distortions, lags, or unintentional repetitions beyond a certain limit, or
6. Blocking diagnostic commands 16 to control unit 14 when it responds with certain error codes 30.

Figure 3:
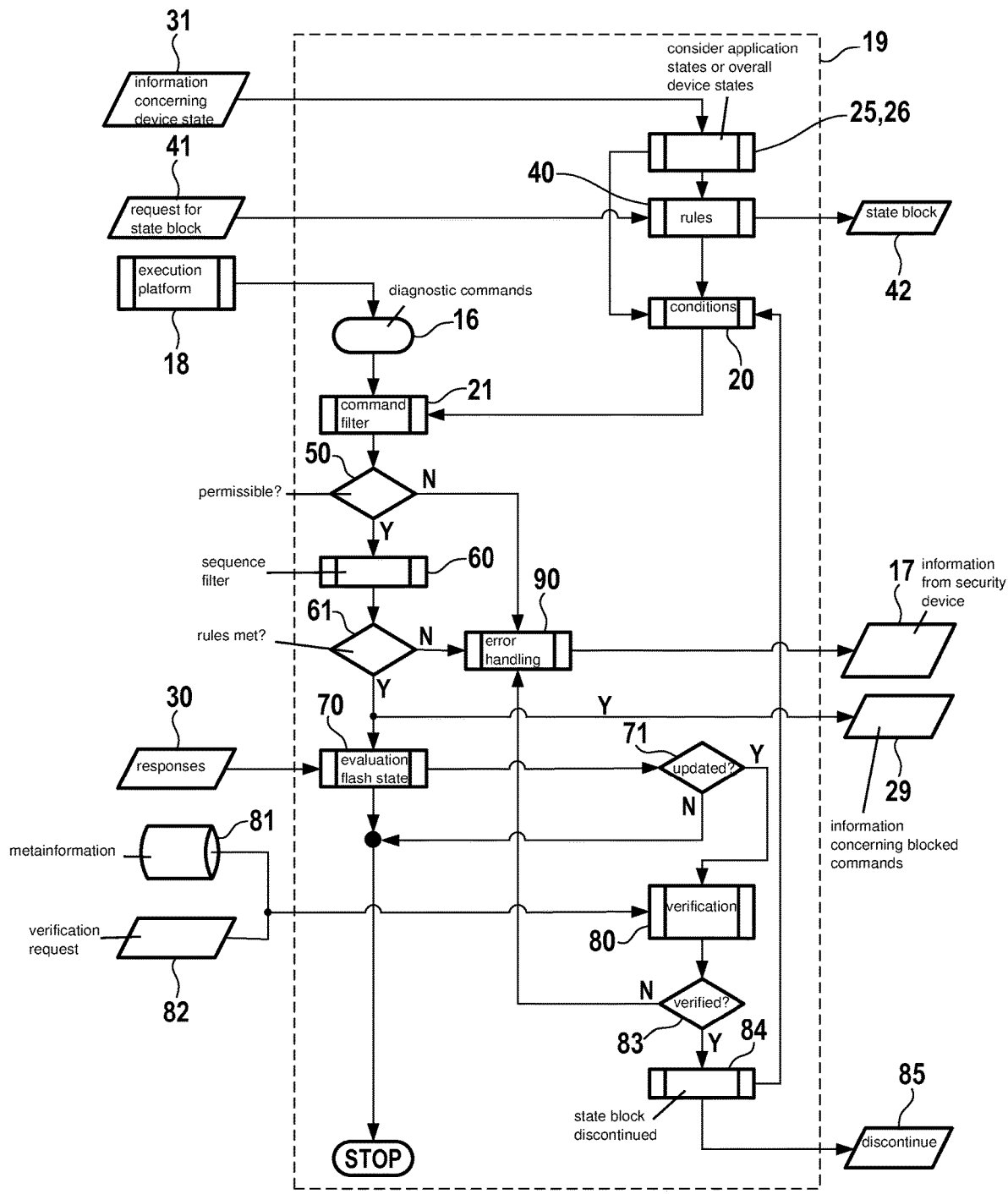
FIG. 3 shows an example of the process for security.

One specific embodiment of security device 19 with a command filter 21 includes, among other things, the activities depicted in FIG. 3. In particular specific embodiments, it is not always necessary for all activities of the executing components to differ in the actual execution:
1. Updating firmware, application software, or other services with the aid of diagnostic commands is allowed only when the overall device (the vehicle, for example) is in a secure state. In the case of a vehicle, such a state would be, for example, a standstill with the brakes applied. Leaving this state is not allowed until the service, for example checking the update of the firmware or application software, is successfully completed. For this purpose, the service requests a state block 41 from the dynamic area. Other designs are also possible in which the request for state block 41 is made in secured area 13, for example.
   The request for state block 41 is checked for permissibility, based on information 31 concerning the device state in secured area 13, via rules 40. If rules 40 are met, the state block is imposed. State block 42 itself is to be implemented via further, secured measures in the overall device, for example by preventing the engine from starting, or actuating a parking brake.
2. After state block 41 is requested, execution platform 18 transmits a sequence of diagnostic commands 16 in dynamic area 12.
3. Diagnostic commands 16 are scanned in the secured area and checked for permissibility in command filter 21, based on conditions 20. Conditions 20 in turn may be a function of information concerning, for example, application state 25, overall device state 26, status of state block 40, 84, driver confirmations, or sensor information and other types of information.
4. Diagnostic commands assessed as permissible may be checked 60 for a valid sequence or frequency in a sequence filter. If rules 60 for the diagnostic command sequence are met 61, valid diagnostic command 29 is relayed to control unit 14. Designs without this sequence filter are also possible.
5. Diagnostic commands 16 that have been recognized in command filter 21, 50 or sequence filter 60, 61 as impermissible are blocked and are not relayed to control unit 14.
   Information 17 concerning the blocked commands, which may be negative response codes (NRC), for example, is provided via error handling (90).
6. The flash state is subsequently queried 30 and evaluated 70 by control unit 14. If all software blocks have not yet been updated, the service is continued.
   When all software blocks are updated, a verification 80, 83 of the updated software takes place. The verification is requested 82 from the dynamic area, for example. Such a verification may include, for example, checking the updated software version, relevant error memory entries, or dependencies of the software versions on other control units. The verification of the updated software version takes place, for example, based on metainformation 81 which describes, for example, the proper version of the software of control unit 14 after successful updating, or the dependency on other control units. It is thus possible to check for consistency and completeness, for example by determining whether all necessary control units 14 have been updated 71 for a service. The metainformation comes, for example, unchanged from connectivity area 11 or dynamic area 12. Measures are to be taken on the level of the overall device which prevent manipulation of these metadata over the air interface and into the secured area.
7. After successful verification 80, 83 of the updated software, which may relate to all control units 14 affected by the service, the initially granted state block is discontinued 84, 85. The service is thus successfully concluded. The stated metainformation 81 determines which control units 14 are to be included in the verification.
   If the verification of ECUs 14 is not successful 8, the result of the verification is supplied to error handling 90, within the scope of which appropriate information 17 is output.

What is claimed is:

1. A device for monitoring diagnostic commands to a control unit, comprising:
   an execution platform; and a security device, connected to the execution platform, including a command filter and state machines;
wherein:
the execution platform is configured to generate the diagnostic commands based on predefined scripts;
the command filter is configured to select valid commands from among the diagnostic commands, based on conditions following from states of the state machines; and
the security device is configured to relay or block the commands to the control unit.

2. The device as recited in claim 1, further comprising a dynamic area and a secured area, the dynamic area includes the execution platform, and the secured area includes the security device.

3. The device as recited in claim 2, further comprising a connectivity area, wherein the execution platform is configured to receive the scripts from the connectivity area.

4. The device as recited in claim 3, wherein the execution platform is configured to return information from the secured area into the dynamic area or the connectivity area.

5. The device as recited in claim 1, wherein the selecting of the valid commands takes place also based on certain responses by the target control unit.

6. The device as recited in claim 1, wherein a state block is imposed on request in order to update software of the control unit, based on predefined rules, and after successful verification of the updated software, the state block is discontinued.

7. The device as recited in claim 1, wherein the security device also includes a sequence filter, and the sequence filter is configured to check the valid commands for a permissible sequence or frequency, based on further rules.

8. The device as recited in claim 1, wherein the states include application states, and/or the states include device states.

9. The device as recited in claim 1, wherein the state machines are in a mutual information exchange, and/or the states are in a mutual blocking relationship.

10. A motor vehicle, comprising:
a control unit; and
a device for monitoring diagnostic commands to the control unit, the device including:
an execution platform; and
a security device, connected to the execution platform, including a command filter and state machines;
wherein:
the execution platform is configured to generate the diagnostic commands based on predefined scripts;
the command filter is configured to select valid commands from among the diagnostic commands, based on conditions following from states of the state machines; and
the security device is configured to relay or block the commands to the control unit.

* * * * *

UNITED STATES PATENT AND TRADEMARK OFFICE
CERTIFICATE OF CORRECTION

PATENT NO. : 11,455,393 B2
APPLICATION NO. : 16/753614
DATED : September 27, 2022
INVENTOR(S) : Leonhardi et al.

Page 1 of 1

It is certified that error appears in the above-identified patent and that said Letters Patent is hereby corrected as shown below:

On the Title Page

In Item (86) PCT No.: PCT/EP2018/077464
§371 (c)(1), (2) Date replace:
"April 3, 2020"
With:
--May 11, 2020--

Signed and Sealed this
Fifteenth Day of November, 2022

Katherine Kelly Vidal
*Director of the United States Patent and Trademark Office*